D. H. WHITTEMORE,

Assignor to H. S. WHITTEMORE.

Apple Parer, Corer, and Slicer.

No. 9,774. Reissued June 21, 1881.

Witnesses,
Frank L. Durand
Aug. A. Nicholson

Inventor.
David H. Whittemore

N. PETERS, Photo-Lithographer, Washington, D. C.

UNITED STATES PATENT OFFICE.

DAVID H. WHITTEMORE, OF WORCESTER, ASSIGNOR TO H. S. WHITTEMORE, OF FRAMINGHAM, MASSACHUSETTS.

APPLE PARER, CORER, AND SLICER.

SPECIFICATION forming part of Reissued Letters Patent No. 9,774, dated June 21, 1881.

Original No. 93,574, dated August 10, 1869. Application for reissue filed May 17, 1881.

*To all whom it may concern:*

Be it known that I, DAVID H. WHITTEMORE, of Worcester, in the county of Worcester, State of Massachusetts, have invented certain new and useful Improvements in Apple Paring, Coring, and Slicing Machines; and I do hereby declare the following to be a full, clear, and exact description of the same, due reference being had to the accompanying drawings.

Figure 1:
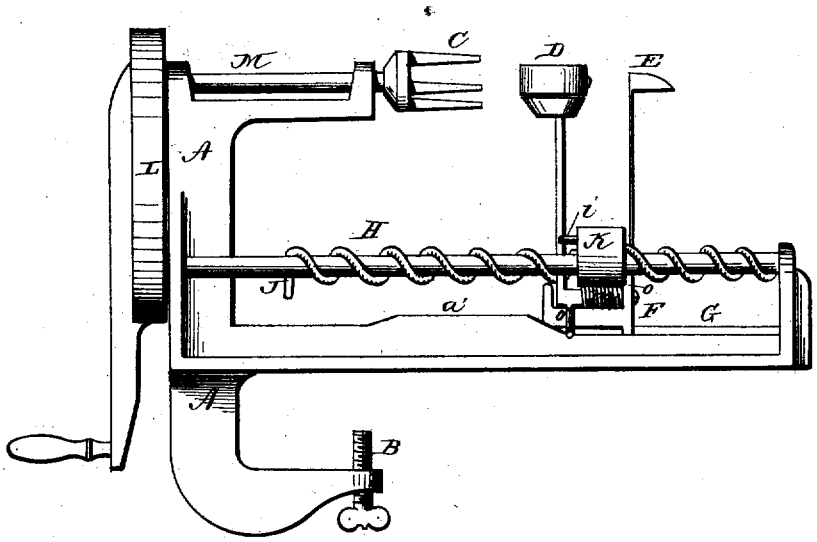
Figure 2:
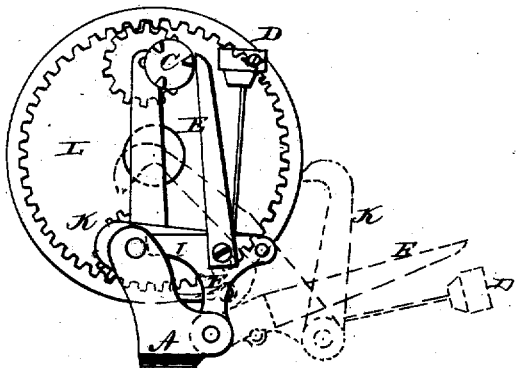
Figure 3:
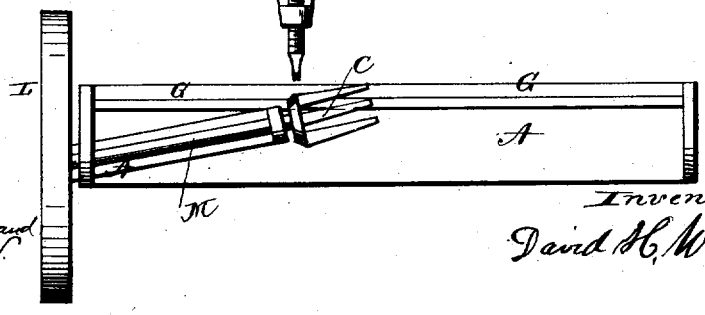

Figure 1 is a side view of my improved apple parer, corer, and slicer. Fig. 2 is an end view, and Fig. 3 is a plan.

The same letters indicate the same parts in each.

A is the frame, made all of metal, which I have heretofore made with metal standards on a wood board. B is the screw to hold it to the table while using; C, the fork on which the apple is placed; D, the paring-knife; E, the slicing and coring knife; F, the carriage holding both knives; G, the slide-rod for the carriage F; H, the screw-shaft, giving motion to the carriage by the arm I. J is a projection on the screw to release the holder K. L is the crank-wheel, giving motion to both the screw-shaft H and fork-shaft M by gears gearing into it upon opposite sides. C is the apple-fork, made with three tines, for holding the apple to be pared, cored, and sliced.

The carriage is made to both slide and turn freely on the rod G, and has a projecting arm, I, the end of which fits between the threads of the screw H.

The holder K is pivoted at one end to the carriage F, and the other is so formed as to hook over the screw H and rest on it, holding the arm I into the screw.

At *i* is a stud, against which a projection, I, on the screw hits to throw off the holder.

The paring-knife D is hung on pivots at the bottom of its stem, and has a spring to press it against the apple, and a stud at *o*, resting on the edge *a* of frame A, to guide the knife D clear of the fork when not paring, the spring *m* allowing the knife D to conform to the surface of the apple while holding it to its work.

The fork C is set at an angle with the slide-rod G, as shown in Fig. 3, giving a taper to the core left by the knife.

The frame being placed on the edge of a table, a turn or two of the screw B will hold it firmly. The apple or object to be pared is placed on the fork C and the carriage F turned to place, as in Fig. 2. The holder K falls over the screw H, and, motion being given to the crank, the carriage F is drawn along, bringing the knives to the apple. If it is desired at any time to release the carriage, a slight backward motion of the screw raises the holder and lets the carriage fall to the position shown in Fig. 2 in dotted lines, or when the apple is finished the projection J hits the stud *i* on the holder and throws it off.

The advantages of this machine over those patented by me in 1857 for the same purpose, on which this is an improvement, are manifest: The facility of paring small apples without using the whole length of the slide; the greater security against getting out of order by having the frame all of metal; making the screw or feed shaft separate from the fork-shaft and placing it parallel with it, thus shortening the machine to make it more compact; the power being applied to the carriage through this additional screw-shaft and placed in the position, as shown, moves the carriage better than when the screw is upon the fork-shaft, as in the old way and others, making it a more convenient and effective parer, corer, and slicer; and when the slicing-knife is removed for simply paring the apple the slide can be more readily disengaged as soon as the paring is done.

What I claim as new, and desire to secure by Letters Patent, is—

1. The holder K, hung to the carriage F by a pivot at one end, the other end made with a hook or hasp to hook over the screw H to hold the carriage with the knives in position when an apple is being pared and sliced, and allowing the carriage to tip back or unhook when the apple is finished, substantially as described.

2. The combination of the projection J on the screw with the holder K and its stud *i*, substantially as described.

3. The combination of the fork C and its shaft with the paring and slicing device, consisting of the carriage, knives, screw feed-shaft or driving apparatus, and metal frame, when combined in the manner and for the purposes above set forth and described.

4. In an apple-parer, the combination of the internal peripheral gear with a fork-shaft and the screw feed-shaft for the slide-carriage, parallel to each other, extending through the uprights of the frame, and furnished with gear-wheels meshing in opposite sides of said internal gear, substantially as described.

DAVID H. WHITTEMORE.

Witnesses:

AUG. A. NICHOLSON,

W. F. HELLEN.